United States Patent Office 2,857,534
Patented Oct. 21, 1958

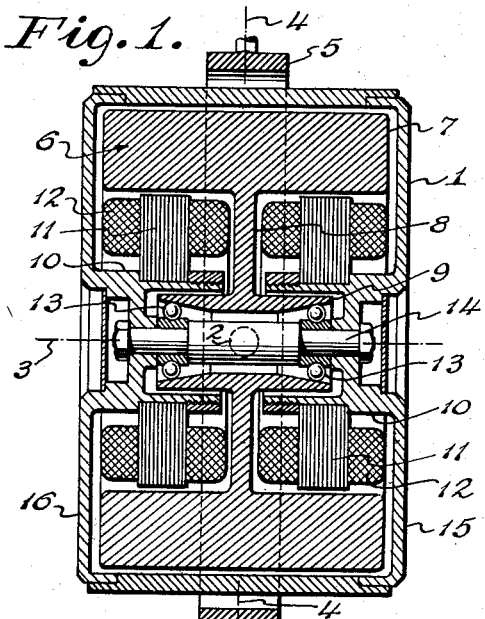

2,857,534

COMBINATION ELECTRIC MOTOR AND GYROSCOPIC STRUCTURES

Lennox F. Beach, Sea Cliff, N. Y., assignor to Sperry Rand Corporation, a corporation of Delaware Application July 6, 1954, Serial No. 441,414

9 Claims. (Cl. 310—74)

This invention relates to the construction of gyro rotors used in sensitive gyroscopic instruments, especially electrically driven gyro rotors. To obtain the extremely high accuracy required in sensitive gyroscopic instruments, such as directional gyros, it is necessary to eliminate all causes of possible changes in the balance of the system about all of its axes of freedom as well as to eliminate as far as possible friction about such axes. The most frequent cause of change of shift in the center of gravity of the system is temperature change which is apt to cause an unsymmetrical shift in the relative position of the parts.

Another cause is lack of homogeneity in the metal making up the rotor. Thus, in most rotor constructions the main mass of the flywheel is composed of a heavy metal such as iron, while the windings or other parts of the rotor constituting one part of the electric motor construction are secured to or built in the rotor. For example, in the induction type motor driven rotor, it is common to make slots in a periphery of the rotor (either in the inner or outer periphery) in which are imbedded the so-called squirrel cage windings usually in the form of copper rings of rectangular shape. If the self-synchronous type of A. C. motor is employed, it is usual to secure or imbed washers or discs of hard, permanent magnetic steel in the rotor to aid the lock-in or synchronous operation. It is also usual to build up the rotor in several separate parts, namely, the hub, which usually supplies one race for each of the ball bearings, an outer flywheel or rim, which usually constitutes the electro motor portion, and a narrow web connecting the hub and rim. An example of such construction is shown in the prior patent to C. E. Barkalow, No. 2,641,132, dated June 9, 1953, for Gyroscopic Rotor Frame. In this construction, it will be noted that two spinning motors are provided located symmetrically on opposite sides of the center of support of the gyro whereby thermal expansion of the rotor and its electromotor parts do not disturb the balance about its horizontal axis.

According to my invention, however, I go much further than the prior art and reduce the causes of drift of the gyro by making the rotor a single homogeneous piece or block of hardened magnetizable steel such as high carbon chrome steel. Preferably, this steel is chosen not only to retain its magnetism but to have the proper characteristics of uniform hardness so as to serve as the moving element of suitable bearing means which may be the outer race of the rotor bearings. Further, no windings or other inserts of different material are incorporated in the rotor as is the usual practice in the prior art. For this purpose, I have successfully employed the grade of steel known as SAE 52100, having a uniform hardness of 62 on the Rockwell "C" scale. By this construction, I not only lessen errors due to temperature shift but also lower the cost of manufacture and give greater freedom of design. The main cause of temperature shift is eliminated because no parts are pressed or clamped, or placed in the rotor which, under the influence of heat or centrifugal force, may cause shift in the center of gyration of the rotor. This is an important consideration in the design of gyroscopes for inertial naviagtion systems.

It is further found that such a combination electric and gyroscopic rotor construction when emploeyd in connection with a three-phase stator will operate as an induction or hysteresis motor to bring the gyro up to synchronous speed when it locks in as a synchronous motor. I may temporarily increase the voltage supplied to the stator at this time to increase the magnetism of the rotor, after which the voltage is reduced to the normal voltage. The gyro operates thereafter as a synchronous motor with minimum current consumption.

Referring to the drawings showing several preferred forms of my invention,

Fig. 1 is a vertical section of a gyroscopic rotor case and rotor which is constructed according to my invention;

Fig. 2 is a similar view of a modified form of rotor;

Fig. 3 is a vertical section of the rotor case and rotor of Fig. 2 taken approximately on line 3—3 of Fig. 2;

Fig. 4 is a section view of a further modification of rotor and spinning means in which the drive torque is imparted through the web of the flywheel; and Fig. 5 is still a further modification in which the driving torque is imparted from the stator to the hub portion of the flywheel.

The gyroscope is shown as enclosed in a rotor case or frame 1 which, it will be understood, is supported for freedom about at least one axis 2 other than the spin axis 3. If the gyroscope is of the free or universal type, a second axis of freedom 4—4 is provided for the gimbal ring 5 which pivotally supports the case 1 on the aforesaid axis 2. The rotor proper 6 is preferably formed of a single block of hard, high carbon chrome steel, as stated, which retains magnetism and is shaped to provide an outer heavy rim 7 connected by the web 8 with the hub portion 9. This construction provides two undercut portions of the rim which preferably form the driven portion of two polyphase A. C. motors. The stator portions of each are mounted on projections 10 extending inwardly from the casing 1 beyond the hub 9 on both sides of the web and on each of which are mounted the stator magnetic structure 11 and the three-phase windings 12. The hollow hub portion 9 extends in both directions from the web within the inwardly extending projections 10 on the case 1 and preferably provide outer races for both rotor bearings 13 mounted on the tie shaft 14 extending between the two sides 15 and 16 of the rotor case. Preferably the interior of each end of the hub 9 is bevelled or flares outwardly as shown, thereby reducing or eliminating end shift of the rotor during operation.

While the rim or flywheel portion may be solid as shown in Fig. 1, I prefer to reduce the amount of steel in the rotor near the stator so as to concentrate the magnetizing flux from the stator in a particular annular section of the magnetizable rotor. For this purpose, I have shown spaced annular grooves or slots 17 in Fig. 2 which are cut into one face of the rotor, but leaving spaced webs 18 joining the outer and inner portions of the rim 7'. It is understood that if this construction is employed in connection with the double motor drive of Fig. 1, said slots will be cut in the opposite faces.

Several other modifications are also shown in Fig. 2. Only a single driving motor is shown on one side of the flywheel. The center of the rotor is shaped in the form of a stub shaft 19 instead of a hollow hub, the stub shaft being ground to a cone shape on each end to provide the inner race of the rotor bearings 20.

In Fig. 4, the drive between the stator and rotor is made through the web 8' of the rotor and in this case the two induction stators are mounted to face each other on the end plates 15' and 16' and between them extends the web. Preferably, the web 8' has cutout portions or annular slots 21 in a particular section of the web part of the rotor for the same purpose as the slots 17 in Fig. 2. This modification also shows a different hub construction of the rotor which is formed as a sleeve 22 acting as the inner races of the rotor bearings 23. Proper spacing in this case is maintained by compression strut 24 clamped between set screws 25, 25' in the end caps 26 secured in the end plates 15', 16'.

In a further modification shown in Fig. 5, the driving torque is effected between the three-phase stator windings and the hub portion 9' of the rotor. Two stators are shown as mounted on annular webs 27 extending inwardly from the end plates 15", 16". Preferably, slots 28 are provided in the hub to concentrate the magnetizing flux in the annular section of the hub part of the rotor between the slots.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A combination consisting of a pair of synchronous motors and a gyroscopic structure having a case, a gyroscopic and dual electric motor rotor composed of a unitary piece of hard magnetizable steel having rim, web and hub parts one of said parts including means for substantially confining the magnetic flux in a relatively thin annular section of said one part, bearing means on said case journalling the rotor hub part about the spin axis of the unitary electric and gyroscopic rotor, and a pair of spaced polyphase wound stators for the electric motors fixed to the case in concentric relation to the axis of the unitary electric and gyroscopic rotor with the web part therebetween in a position to supply flux to magnetize said thin annular section.

2. The combination claimed in claim 1 in which the rotor is slotted to provide the flux concentration section and the stators are positioned to supply flux to a thin annular section in the web part of the unitary rotor.

3. The combination claimed in claim 1 in which the rotor is slotted to provide the flux concentration section and the stators are positioned to supply flux to a thin annular section in the hub part of the unitary rotor.

4. A combination synchronous motor and gyroscopic structure comprising a frame, a gyroscopic electric motor rotor composed of a unitary piece of hard magnetizable steel having rim, web and hub parts, bearing means on said frame journalling the hub part about the axis of the unitary electric and gyroscopic rotor, and at least one polyphase wound stator for the electric motor fixed to the frame in concentric relation to the axis of the unitary electric and gyroscopic rotor in a position to supply driving flux to one of said parts, and means on said one of said parts for subsantially confining said flux to a relatively thin annular section therein.

5. The combination claimed in claim 4 in which the rim of the rotor includes means for substantially confining said flux to a relatively thin annular section therein and the stator is positioned to supply flux to the thin annular section in the rim part of the unitary rotor.

6. The combination claimed in claim 4 in which the web of the rotor includes means for substantially confining said flux to a relatively thin annular section therein and the stator is positioned to supply flux to the thin annular section in the web part of the unitary rotor.

7. The combination claimed in claim 4 in which the hub of the rotor includes means for substantially confining said flux to a relatively thin annular section therein and the stator is positioned to supply flux to the thin annular section in the hub part of the unitary rotor.

8. A combination synchronous motor and gyroscopic structure comprising a frame, a gyroscopic and electric motor rotor composed of a unitary piece of hard magnetizable steel having rim, web and hub parts, one of which includes an annular section therein for the concentration of magnetic flux, bearing means on said frame journalling the hub part about the axis of the unitary electric and gyroscopic rotor, and a polyphase wound stator for the electric motor fixed to the frame in concentric relation to the axis of the unitary electric and gyroscopic rotor in a position to supply flux to magnetize the flux concentration section of the unitary piece in which the rotor is slotted to provide the flux concentration section and, the stator is positioned to supply flux to a concentration section in the web part of the unitary rotor.

9. A combination synchronous motor and gyroscopic structure comprising a frame, a gyroscopic and electric motor rotor composed of a unitary piece of hard magnetizable steel having rim, web and hub parts, one of which includes an annular section therein for the concentration of magnetic flux, bearing means on said frame journalling the hub part about the axis of the unitary electric and gyroscopic rotor, and a polyphase wound stator for the electric motor fixed to the frame in concentric relation to the axis of the unitary electric and gyroscopic rotor in a position to supply flux to magnetize the flux concentration section of the unitary piece in which the stator is positioned to energize the hub part of the unitary rotor.

References Cited in the file of this patent

UNITED STATES PATENTS

| 547,069 | Gorges | Oct. 1, 1895 |
| 1,913,211 | Prince | June 6, 1933 |
| 2,550,571 | Litman | Apr. 24, 1951 |

FOREIGN PATENTS

| 21,671 | Great Britain | of 1910 |
| 2,120 | Great Britain | of 1913 |
| 473,048 | France | Dec. 28, 1914 |
| 251,389 | Great Britain | May 6, 1926 |
| 676,046 | Great Britain | July 23, 1952 |

OTHER REFERENCES

Journal of AIEE, London, August 1948, vol. 95, Part II, page 418, paragraph 9.